May 13, 1952     J. A. KENNEDY     2,596,248
VEHICLE DRIVING CHAIN
Filed Aug. 17, 1946
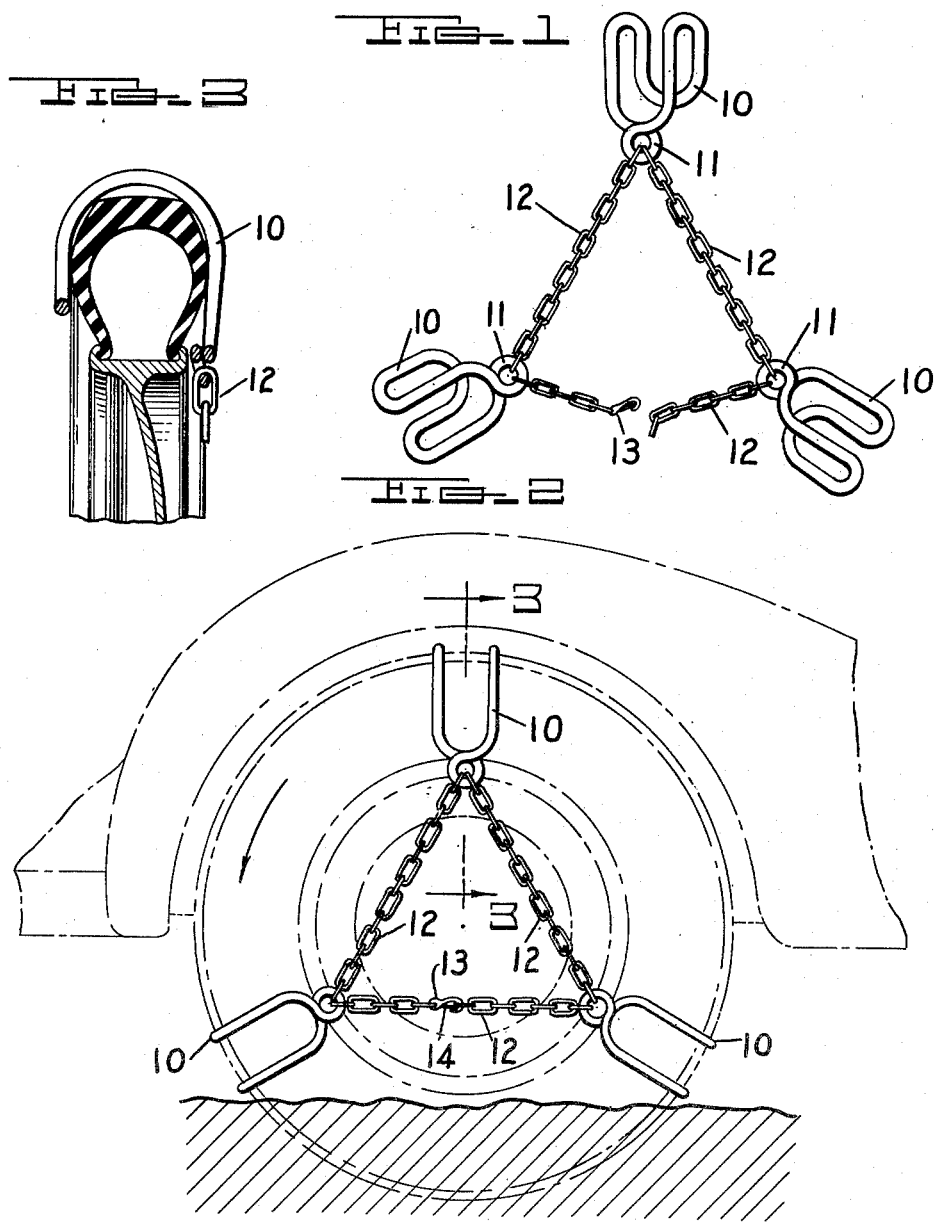
INVENTOR.
JAMES A. KENNEDY
BY Gregory S. Dolgorukov
ATTORNEY

UNITED STATES PATENT OFFICE 2,596,248

VEHICLE DRIVING CHAIN

James A. Kennedy, Ann Arbor Township,
Washtenaw County, Mich.

Application August 17, 1946, Serial No. 691,231

1 Claim. (Cl. 152—225)

This invention relates to land vehicles and more particularly to an improved chain for the driving wheels thereof, such as used to prevent the slippage of the driving wheels on ice, snow or in mud.

It is well known that because of the provision in the driving axle of a vehicle of a differential device, should one of the driving wheels of the vehicle lose traction with the road by getting on ice, deep snow or into a mud hole, it begins spinning while the other driving wheel remains stationary, thus stalling the vehicle. One of the effective means for avoiding such stalling is the use of chains on the driving wheels of the vehicle, and numerous types of such chains have been provided. However, chains so far devised, while being effective for the purposes intended, have a serious disadvantage of being rather difficult to put on the wheels particularly after the vehicle becomes stalled. Their installation became still more difficult with the advent of disk wheels and virtual disappearance of the spoke wheels; they usually require jacking up the vehicle and often have to be installed in advance. Chains on the driving wheels greatly reduce the speed of the vehicle, and their installation in advance of setting out or use in any prolonged driving is a serious handicap for the operation of a vehicle. Therefore with the exception of certain localities, an average operator of a motor vehicle avoids use of such chains and by far the greater majority of vehicle operators do not even carry such chains in the vehicle and depend on towing service in case they become stalled. In view of the above situation, a complicated and expensive towing service is maintained by various commercial organizations, which service has to be made available to the public on a much larger scale than would otherwise be necessary.

One of the objects of the present invention is to provide improved chains for the driving wheels of land vehicles, particularly motor vehicles, which chains can be quickly and easily put on the wheels, including disk wheels, as well as on the wheels of vehicles having fender shields partly enclosing the wheels.

Another object of the invention is to provide improved chains for the driving wheels of motor vehicles, which chains can be easily applied to the wheels after the vehicle becomes stalled, and without the necessity of getting any part of the chain under the wheel as well as without jacking up the vehicle; thus the necessity of putting the chains on in advance and the resulting disadvantages in the subsequent operation of the vehicle are avoided.

A further object of the invention is to provide improved driving chains for motor vehicles, which can be easily applied to the driving wheels thereof after the necessity arises and only to the spinning wheel, and taken off just as speedily and easily after the vehicle is driven out of the dangerous portion of the road, thereby providing, in effect, not only chains for winter driving only but also an emergency device for the entire year's driving, and thus making it possible to decrease greatly the necessity of maintaining ever ready towing service in expectation of the usual frequency of stalling of vehicles.

A still further object of the invention is to provide an improved driving chain for motor vehicles, which chain can be put on the wheel by a women or even a child.

A still further object of the invention is to provide improved driving chains for motor vehicles, which chains are self tightening by operation of the vehicle.

A still further object of the present invention is to provide an improved driving chain for motor vehicles, which chain can be put on the vehicle wheel from the outside thereof.

A still further object of the present invention is to provide an improved driving chain for motor vehicles which chain may fit a considerable range of wheels and tires sizes.

A still further object of the invention is to provide an improved driving chain for motor vehicles, which is simple in construction, dependable in operation and very inexpensive to manufacture.

Other objects of this invention will appear in the following description and appended claim, reference being had to the accompanying drawings forming a part of this specification, wherein like reference characters designate corresponding parts in the several views.

Fig. 1 is a perspective view illustrating a driving chain embodying the present invention.

Fig. 2 is a view showing the chain of Fig. 1 applied or installed on the left rear wheel of a motor vehicle.

Fig. 3 is a sectional view taken in the direction of the arrows on the section plane passing through the line 3—3 of Fig. 3.

Fig. 4 illustrates one form of a chain lock used in the chain.

Before explaining in detail the present invention, it is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation. Particularly the term "driving chain" as used in the specification and claims, is employed for the lack of better descriptive term and for the sake of brevity to designate a device of the character described and intended for improving the traction of land vehicles. The use of this term should not be taken as limiting the invention to the construction using a chain or chains as a structural element or elements, since my improved device may be constructed in such a manner that no part of it whatever is a chain.

In the drawing there is shown, by way of example, a driving chain embodying the present invention. Referring to the drawing, the chain illustrated therein comprises a plurality, in the present instance three hook members 10 which can be hooked on the tire from the outside and to fit thereon as shown in Fig. 3. The hook members 10 are of rigid construction and may be made by drop forging method or bent from rolled preferably round stock and butt welded. Each of the hooks is provided with an eyelet 11 to accommodate connecting means, in the present embodiment chain sections 12. The lengths of the chain sections 12 are selected to make the hook member fit the most widely used wheel and tire size.

One of said chain sections has a selectively separable locking means 13 for facilitating putting the driving chain on and taking it off. The locking means may be of any suitable type. I prefer to use a hook type lock such as one shown in Fig. 4 designated therein by the numeral 13 and having a spring 14 preventing self-unlocking of the chain.

Fig. 2 illustrates the driving chain described above and put on or applied to the left rear wheel of a passenger motor vehicle, the wheel being shown embedded in mud for a depth approaching that of the tire. With the wheel being in the rut as shown and the vehicle stalled, for putting the chain on it is only necessary to open the lock 13 and to hook one of the hook members 10 on the tire at the top thereof; thereupon the other two hook members are hooked on the tire on both sides of the top hook member and moved down around the wheel until the side chain sections are tightened up sufficiently to permit closing the lock 13.

In operation, as the wheel rotates, the left hand side chain section will tend to be slackened while the lower chain section will be tightened, pressing the right lower hook member firmly against the tire. The left hand hook member will then move to the ground and establish traction between the tire and the ground enabling the vehicle to move forward for a distance equal substantially to one third of the length of the tire circumference less the distance of some slippage. The left hand side hook member is thus moved into the position of the right hand hook member, the upper hook member has been moved down and is ready to contact the ground and to repeat the cycle.

After the vehicle has thus moved out of the slippery portion of the road, the chain may be easily taken off simply by unlocking the lock 13 and taking the hook members off the tire. The slight slack that may be present in the chains in putting them on, while facilitating application of the chain, disappears in faster driving when centrifugal forces operate to throw the connectors, in the present embodiment of the invention the chains 12, outwardly and thus to tighten the device.

I prefer to use hooks of two-bar construction, but single-bar or multiple-bar hooks may also be used. Also, while the chain sections in the present embodiments are fixed to the eyelets of the hook members 10, a simple chain sliding in the eyelets 11 may also be used. Instead of the triangular arrangement of the chain, a star arrangement may also be used with success.

By virtue of the above construction the objects of the present invention listed above and numerous additional advantages are attained.

I claim:

A detachable traction device adapted to be selectively mounted on a wheel having a tire, said device comprising three hook members, each of said members having a body in the form of an elongated ring bent to form a hook with a single eyelet provided on the end of said body on the outer side of the wheel; three pieces of chain each having ends secured to two adjacent hook members at said eyelets to effect equi-distant arrangement of said members on the tire, said chains being adapted to resist moving of said hook members along the periphery of said tire when said hooks are in contact with the ground, and a separable lock on one of said chains.

JAMES A. KENNEDY.

REFERENCES CITED

The following references are of record in the file of this patent:

UNITED STATES PATENTS

| Number | Name | Date |
|---|---|---|
| 1,213,131 | Penseyres | Jan. 16, 1917 |
| 1,237,274 | Bacon | Aug. 21, 1917 |
| 2,290,398 | Wellington | July 21, 1942 |

FOREIGN PATENTS

| Number | Country | Date |
|---|---|---|
| 524,716 | Great Britain | Aug. 13, 1940 |